United States Patent [19]
Hellbergh

[11] Patent Number: 4,655,648
[45] Date of Patent: Apr. 7, 1987

[54] ROUTER TOOL AND INSERT FOR SAME

[75] Inventor: Axel H. Hellbergh, Sandviken, Sweden

[73] Assignee: Santrade Limited, Lucerne, Switzerland

[21] Appl. No.: 706,327

[22] Filed: Feb. 27, 1985

[30] Foreign Application Priority Data

Mar. 26, 1984 [SE] Sweden ................................. 8401652

[51] Int. Cl.$^4$ .............................................. B23C 5/20
[52] U.S. Cl. ......................................... 407/42; 407/54;
  407/116; 408/224; 144/218; 144/240; 144/241
[58] Field of Search ................. 407/114, 115, 116, 42,
  407/53, 54, 30; 408/222, 224; 144/218, 240, 241

[56] References Cited

U.S. PATENT DOCUMENTS

| | | | |
|---|---|---|---|
| 1,328,430 | 1/1920 | Hathaway | 144/240 |
| 1,354,578 | 10/1920 | Ritchie | 407/115 |
| 2,424,473 | 7/1947 | Luers | 407/116 |
| 3,117,366 | 1/1964 | Castor | 407/116 |
| 3,344,497 | 10/1967 | Osborne | 407/53 |
| 3,574,911 | 4/1971 | Penoyar | 407/114 |
| 3,688,367 | 9/1972 | Bennett | 407/48 |
| 4,068,976 | 1/1978 | Friedline | 407/114 |
| 4,199,284 | 4/1980 | Kress et al. | 407/114 |
| 4,248,553 | 2/1981 | Kraemer | 407/114 |

FOREIGN PATENT DOCUMENTS

| | | | |
|---|---|---|---|
| 87930 | 4/1922 | Austria | 407/53 |
| 846047 | 8/1952 | Fed. Rep. of Germany . | |
| 3323442 | 3/1984 | Fed. Rep. of Germany . | |
| 553614 | 9/1974 | Switzerland . | |

Primary Examiner—Nicholas P. Godici
Assistant Examiner—Jerry Kearns
Attorney, Agent, or Firm—Burns, Doane, Swecker & Mathis

[57] ABSTRACT

A router tool and a cutting insert for transverse cutting of a work piece, preferably of fiber reinforced plastics. The router comprises a shank and a cylindrical router body having chip gullets and sites that have received cutting inserts. Each insert has a cutting edge which has a number of teeth extending in the rotational direction of the router. The inserts are staggered in the axial direction such that the router varying will present a right-handed cutting edge portion and a left-handed cutting edge portion whereby the work piece may be machined without producing defective burrs and fluffy fibers.

9 Claims, 15 Drawing Figures

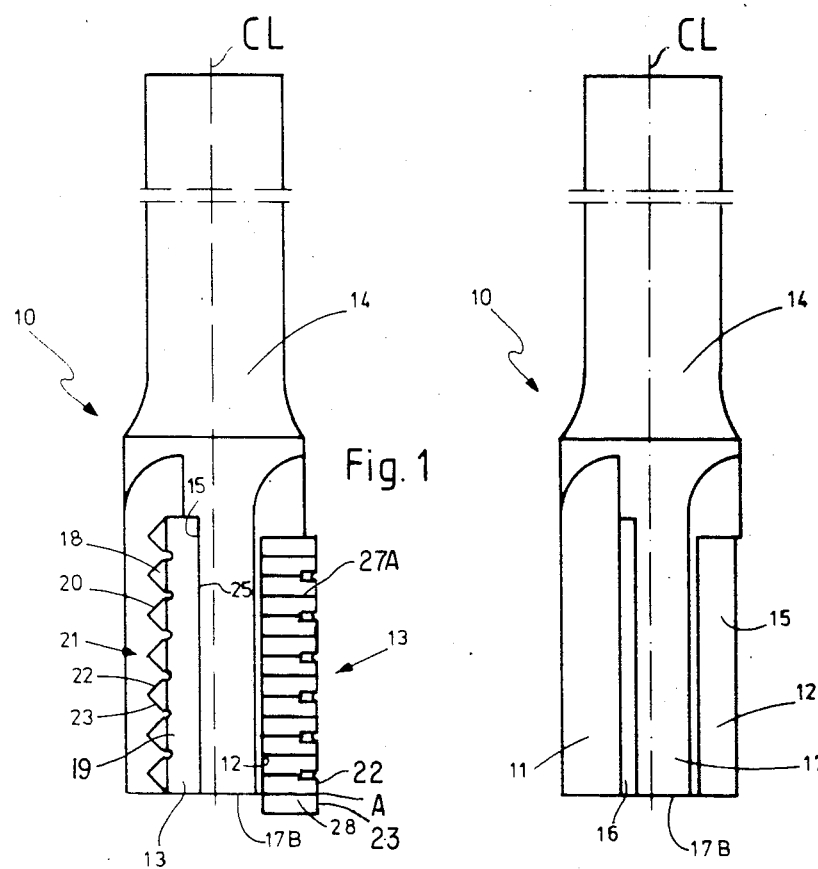
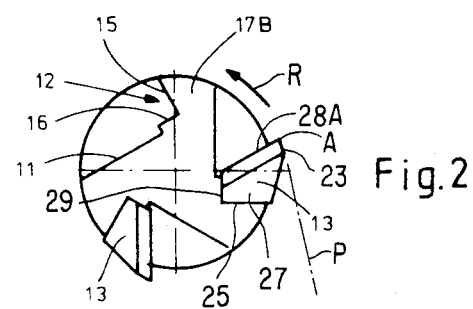

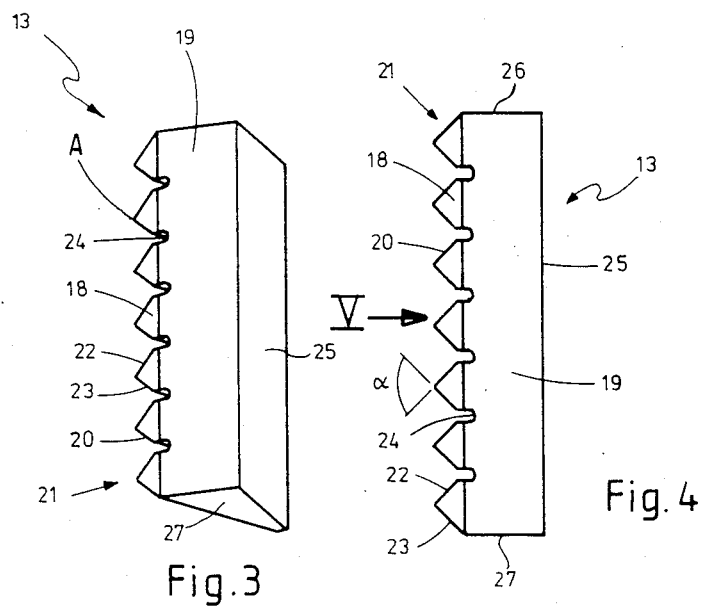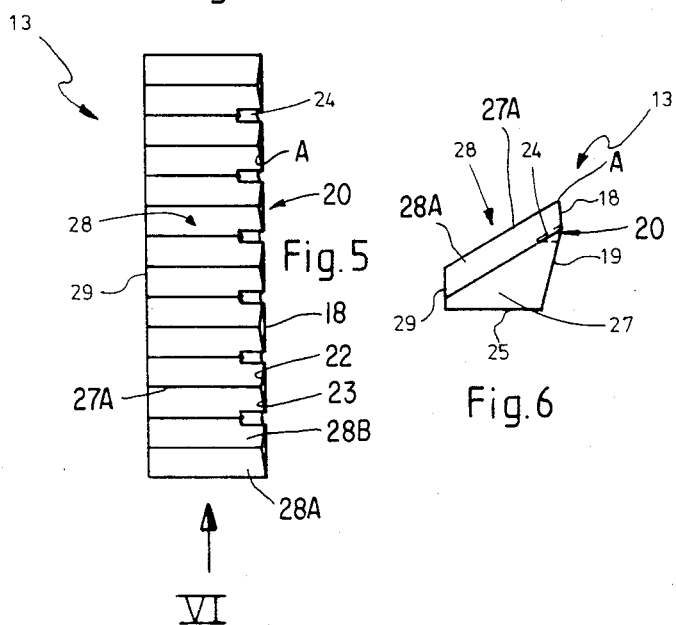

“4,655,648”

ROUTER TOOL AND INSERT FOR SAME

BACKGROUND AND OBJECTS OF THE INVENTION

This invention relates to a router tool and cutting insert for the same for machining of a work piece, preferably of fiber reinforced plastics. The router tool is provided with cutting edges having teeth which mainly project in the rotational direction of the router. The tips of one cutting edge are staggered with respect to the tips of the other cutting edge. Each tooth has cutting portions the main directions of which converge in the rotational direction of the router.

It is previously known to use tools to machine composite materials. The problem when milling composite materials, such as plastics reinforced with polyaramide fibers, is that the fibers are difficult to cut at one or both of the major surfaces of the work piece as the very strong fibers therein are not supported against the arising cutting forces. One of the tools used is a type of milling cutter provided with right-hand and left-hand turned chip gullets, forming crosses on the milling cutter body. This milling cutter body demands a thorough positioning in the axial direction in order to be able to cut the composite material and also causes vibrations during the machining. The fibers being exposed form a fray on one or both sides of the place of machining, i.e. frayed edge. The fray may wind around the milling cutter and cause a clogging of melted plastics, and thus stopping the machining of the material. Furthermore the conventional milling cutters are expensive to fabricate and to regrind.

The present invention is provided to solve the above-mentioned drawbacks, wherein the afore-mentioned tips in one cutting edge are staggered with respect to the tips in the other cutting edge, so that the fibers at least at one instance during a revolution of the cutting tool have support for the arising cutting forces. Furthermore, a planar surface is achieved in the work piece due to the shape of the cutting edges.

BRIEF DESCRIPTION OF THE DRAWINGS

The present invention will be more closely described in connection with the appended drawings showing a preferred embodiment, wherein further characterizing features and advantages will be apparent.

FIG. 1 is a side elevational view of a router tool according to the present invention.

FIG. 1A is a side elevational view of the router body without cutting inserts.

FIG. 2 is a top plan view of the router tool shown in FIG. 1.

FIG. 3 is a perspective view of a cutting insert according to the present invention.

FIG. 4 is a side elevational view of the cutting insert shown in FIG. 3.

FIG. 5 is a front view of the cutting insert according to the arrow V in FIG. 4.

FIG. 6 is a top plan view of the cutting insert according to the arrow VI in FIG. 5.

DETAILED DESCRIPTION OF PREFERRED EMBODIMENTS OF THE INVENTION

Figure 7:
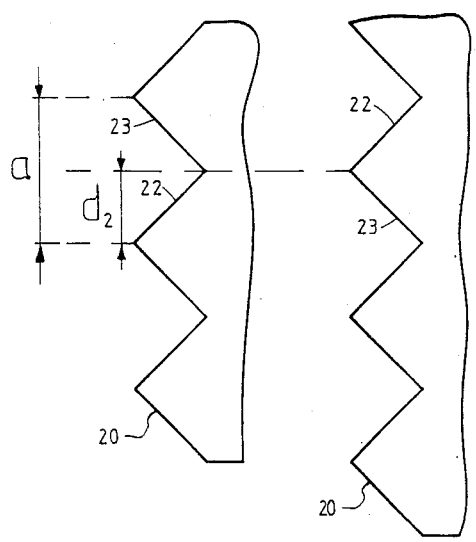
FIG. 7 is a partial and principal view of the cutting edges of two cutting inserts and showing how they are staggered relative to each other.

In FIG. 1 is shown a router tool according to the present invention comprising a router body 10 and three cutting inserts 13 affixed thereto at spaced intervals therearound. The router body 10 has a shank 14 adapted for mounting in conventional chuck means for rotation about its longitudinal axis CL. A cylindrical insert holder portion is disposed axially adjacent the shank 14 and terminates in a free end surface 17B. The router tool inserts 13 are affixed to the insert holder portion such that a generally longitudinally extending cutting edge 20 on each insert 13 is spaced radially outwards of the insert holder portion over a longitudinal portion thereof. Each cutting edge 20 is defined by the intersection of a front surface 28 establishing a positive rake angle and a clearance face 18 diverging from the cutting edge 20 and from an insert bottom surface. The front surface includes a plurality of alternative sharp tips and arcuate valley areas for defining a generally zig-zag like cutting edge configuration along the front surface 28. The locating means in the holder portion is comprised of three spaced insert receiving sites 12 with each site 12 having a bottom wall 16 and a side wall 15. Each site 12 is adapted to receive one of the inserts 13 with the bottom surface 29 thereof engaging the site bottom wall 16 and the insert side face 25 engaging the side wall 15 for locating the associated insert in a desired radial and longitudinal disposition on the holder portion.

Referring now to FIGS. 1A and 2, a cylindrical router body 10 is provided with chip gullets 11 and the sites 12 for receiving and securing three inserts 13, preferably consisting of a hard material. The number of inserts in a router body may be two or more than three and the inserts may be fixed to the sites through brazing, cementing or clamping. The router may also as a whole be made of hard material, such as a cemented carbide. The router body 10 is connected to the shank 14 which is adapted to be attached to driving means. The site 12 includes a tangential surface 15 against which the insert 13 abuts. The end surface 17B of the router is mainly perpendicular to the centre longitudinal axis CL of the router. The chip gullets 11 and the sites 12 both terminate in the jacket surface 17A and in the end surface 17B. The sites 12 are preferably staggered in the axial direction of the router body with respect to each other. In FIG. 2 one of the cutting inserts has been removed from the router body for ease of illustration. The insert 13 has a positive rake angle which is advantageous when machining of laminated material containing fabric reinforcementes, especially plastics reinforced by fibers of polyaramide, such as Kevlar. Kevlar is a trade mark registered by Du Pont. The router rotation is indicated by an arrow in FIG. 2.

Referring now to FIGS. 3 to 6 a cutting insert 13 is provided which is adapted for mounting on the holder portion of the router body. The insert is comprised of a body having a longitudinal extension, a substantially flat bottom surface 29 and a cutting edge 20 extending intermittently, generally longitudinally of the bottom surface 29. The front surface 28 is disposed to have a positive rake angle when the insert is installed on a router body. The front surface 28 also includes a plurality of front surface portions 28A, 28B which converge to form longitudinally alternating sharp tip edges 27A. The tip edges are separated by arcuate valley areas 24 for defining the generally zig-zag like cutting edge 20 configuration in the front surface 28. The tip edges at least at the cutting edges have a radius much smaller than the valley areas 24.

Figure 9:
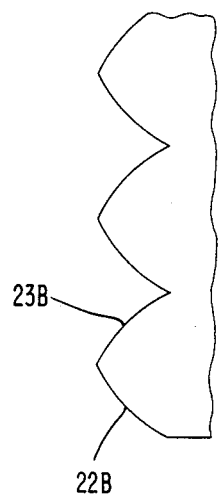
FIGS. 9, 10, 11 depict alternative configurations, respectively, of cutting edge portions according to the present invention.
Figure 10:
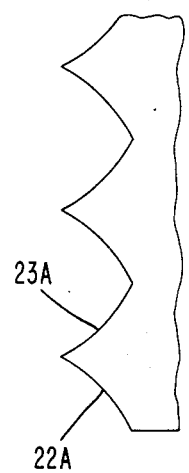
Figure 11:
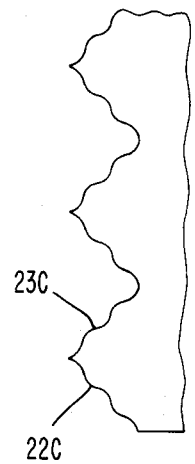

In FIGS. 3 and 4, the insert 13 is shown in a perspective view and a side elevational view, respectively, wherein the insert discloses a first clearance face 18, the clearance angle of which is between 10° to 30°, preferably 20°, and a second clearance face 19 and a cutting edge 20. The cutting edge 20 is profiled in the longitudinal direction of the cutting insert and consists of a number of teeth 21 which are to project mainly in the direction of the router rotation. Each tooth comprises a right-handed cutting edge portion 22 which in function is to resemble a right-handed helical cutting edge of a conventional cutting tool, and a left-handed cutting edge portion 23, which in function is to resemble a left-handed helical cutting edge of a conventional cutting tool. The cutting edge portions 22, 23 converge in the direction of rotation R to form a sharp tip A. The cutting edge portions 22, 23 lie in a common plane P (FIG. 2) oriented generally tangentially with reference to the longitudinal axis CL. The tip of the tooth should be as sharp as possible in order to form a precise transition between the two cutting portions. The radius of the tip should be equal to or less than 0.05 mm and the tip angle $\alpha$ of the tooth 21 is chosen within the range 60° to 90°. The cutting edge portions 22, 23 may, instead of being straight, may be concave, convex or sinusoidal. Concave cutting edge portions 22A, 23A are depicted in FIG. 10. Convex cutting edge portions 22B, 23B are depicted in FIG. 9. Sinusoidal cutting edge portions 22C, 23C are depicted in FIG. 10. The teeth 21 in the first clearance face 18 are separated by rounded portions 24 which lack of sharpness and therefore a fiber does not risk sticking in a sharp corner. The corner will only slide along the fiber so that the following cutting portion, which is staggered relative to the former, may cut the fiber. The cutting insert 13 further comprises a side face 25, an axial upper end surface 26 and a free end surface 27. The side face 25 is arranged to abut on the side wall 15 of the router body 10 and the axial upper end surface 26 shall abut on an axial support surface of the router body 10.

In FIG. 5 is shown mainly the front surface 28 of the cutting insert. The front surface 28 consists of a number of generally V-shaped grooves extending between the first clearance face 18 and the surface 29. The bottom surface 29 shall be supported by the bottom wall 16 of the router body 10. The groove need not extend to the bottom surface 29 but need for example only extend midways therebetween.

FIG. 6 mainly shows the free end surface 27 of the cutting insert 13, which has a wedge-like basic form. The free end surface 27 is limited by the serrated front surface 28, the side wall 25, the bottom surface 29, the first clearance face 18 and the second clearance face 19. The unsharp portions 24 appear as dotted lines. The cutting portions 22, 23 of each cutting tooth 21 converge towards the front surface 28.

Figure 8:
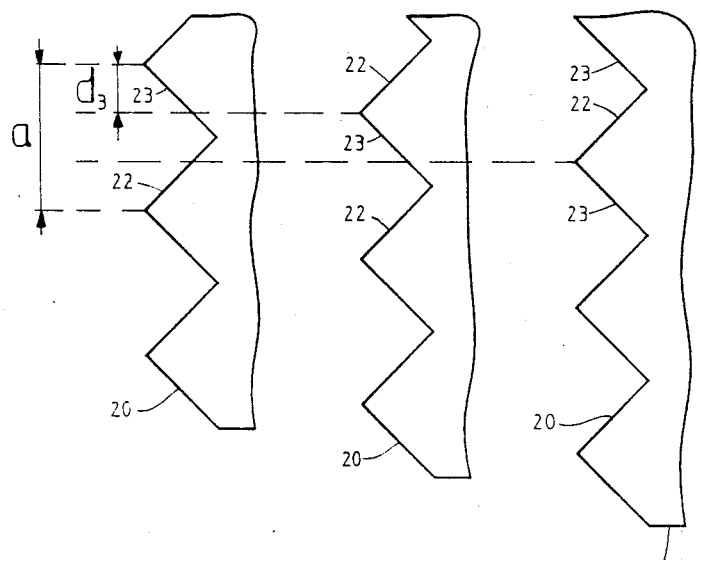
FIG. 8 is a view similar to FIG. 7 but it is showing the cutting edges of three cutting inserts.

In FIGS. 7 and 8 is principally shown how the cutting edges 20 of the router 10 successively are exposed to the work piece, such as an edge of a board containing fiber reinforced plastics, during one revolution of the cutting tool with varying number of inserts in the router. The tips of the cutting edges have been axially staggered relative to each other a distance $d_z$, which is defined as $d_z = a/z$ where a is the distance between two adjacent tips and where z is the number of cutting edges 20. At two cutting edges according to FIG. 7 the distance $d_2$ is $a/2$ and with three cutting edges the distance $d_3$ is $a/3$, see FIG. 8. Thus, the cutting edges 20 are stepped so that the cutting portions will overlap each other. For instance this can be done by moving the inserts with respect to each other or by arranging of the cutting edges differently on the insert, corresponding to a relative movement of the inserts. The purpose with this staggering is that the fibers alternatively will be cut by a right-handed cutting edge portion 22 and a left-handed cutting edge portion 23 so that the cutting edge portions 22, 23 during a revolution of the router will provide a necessary compressive cutting action on the fibers close to the surfaces of the work piece.

Also router tools wherein the distance $d_z$ between the tips of the teeth cannot be related to the number of cutting inserts lie within the scope of the claims.

The invention is also applicable on end cutting tools

The present invention concerning a router make is possible to machine work-pieces, preferably fiber reinforced plastics, without producing defective fraying and remaining fibers on the workpiece edge. Therefore no cost consuming finishing machinings are necessary. Furthermore, this router is not sensitive to positioning within the cutting area, which means that the router also suitable to be used in hand-operated machines. The forces acting upon the router will be out-balanced due to the varying incision of the cutting portions which reduces the vibrations in the work-piece and in the machine. The cutting insert is easy to resharpen by grinding of the first clearance face.

I claim:

1. A router tool comprising a router body defining a longitudinal axis of rotation and containing at least two generally longitudinally extending chip gullets and at least two generally longitudinally extending cutting edges arranged adjacent said gullets for cutting chips from a workpiece as the router body rotates in a forward direction of rotation, said cutting edges each comprising a generally longitudinally extending row of teeth, each said tooth comprising first and second cutting edge portions converging in said forward direction of rotation to form a sharp tip such that said converging cutting edge portions of each tooth lie in a common plane oriented substantially tangentially with reference to said longitudinal axis, said teeth of one said cutting edge being longitudinally staggered relative to the teeth in another said cutting edge.

2. A router tool according to claim 1, wherein said converging cutting edge portions of each said tooth comprise edges of a clearance face, said clearance face facing opposite side directions of rotation.

3. A router tool according to claim 2, wherein each said cutting edge portion is formed by the intersection of said clearance face with a front surface portion, adjacent ones of said front surface portions converging in said direction of rotation to form a tip edge, said tip edges being spaced apart longitudinally.

4. A router tool according to claim 1, wherein mutually adjacent cutting edge portions of longitudinally adjacent ones of said teeth diverge in a direction opposite said direction of rotation to form a non-sharp valley.

5. A router tool according to claim 1, wherein said cutting edge portions are each straight.

6. A router tool according to claim 1, wherein said cutting edge portions are each concave.

7. A router tool according to claim 1, wherein said cutting edge portions are each convex.

8. A router tool according to claim 1, wherein said cutting edge portions are each sinusoidal.

9. A router tool according to clam 1, wherein said cutting edges are formed on hard inserts mounted to said body.

* * * * *